Dec. 19, 1950     R. M. MAGNUSON     2,534,362
ARTICLE ORIENTING APPARATUS

Filed Dec. 22, 1945     2 Sheets-Sheet 1

INVENTOR.
Roy M. Magnuson
By Harper Allen
ATTORNEY

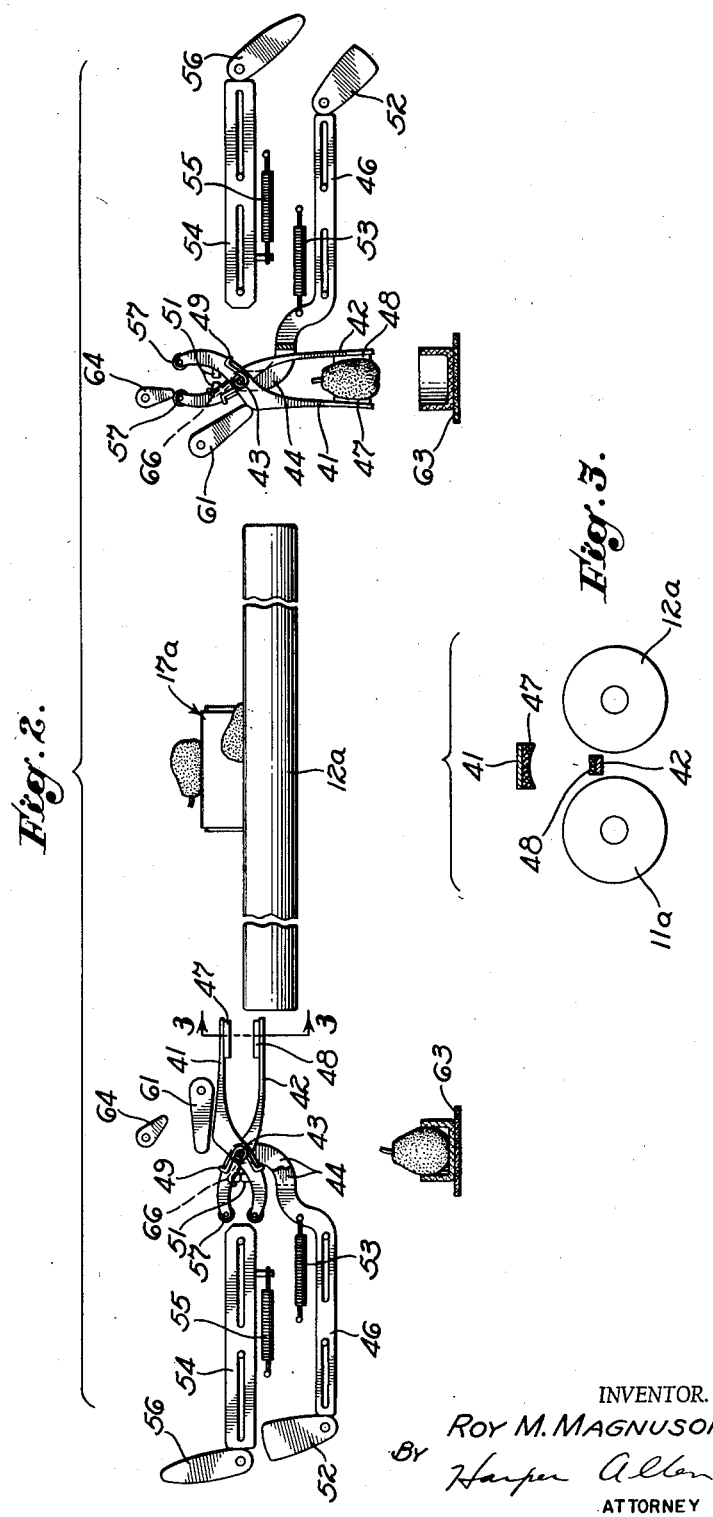

Patented Dec. 19, 1950

2,534,362

UNITED STATES PATENT OFFICE 2,534,362

ARTICLE ORIENTING APPARATUS

Roy M. Magnuson, Campbell, Calif.

Application December 22, 1945, Serial No. 636,569

1 Claim. (Cl. 198—33)

The present invention relates to orienting and feeding apparatus, and is concerned more particularly with apparatus of the above character for use in connection with various types of food articles, such as eggs, peaches, apricots, pears, ears of corn and kindred types of articles having the characteristic of an uneven weight or volume distribution along their longitudinal or stemblossom axes.

It is the general object of the invention to provide new methods and apparatus for orienting articles of the character referred to above.

Another object of the invention is to provide methods and apparatus for receiving indiscriminately arranged articles and for automatically effecting orientation of the articles to a common position.

Another object of the invention is to provide article orienting apparatus employing a troughlike support for articles to be oriented which also applies rotative supporting effects to the articles to effect progression of the articles along the trough in a characteristic fashion dependent upon the weight distribution of the articles along their longitudinal axes.

A further object of the invention is to provide apparatus of the above character in which the articles are all fed in a desired selected direction by turning the articles which are traveling in the opposite undesired direction.

Another object of the invention is to provide improved means for orienting articles and for feeding them to a processing apparatus.

Other objects and advantages of the invention will be apparent from the following description of a preferred embodiment of the invention taken in conjunction with the accompanying drawing, in which:

Figure 2 is an elevational view of a modified form of the apparatus.

Figure 3 is a view of the article pick-up and transfer jaws shown in Figure 2 taken along section line 3—3.

Figure 1:
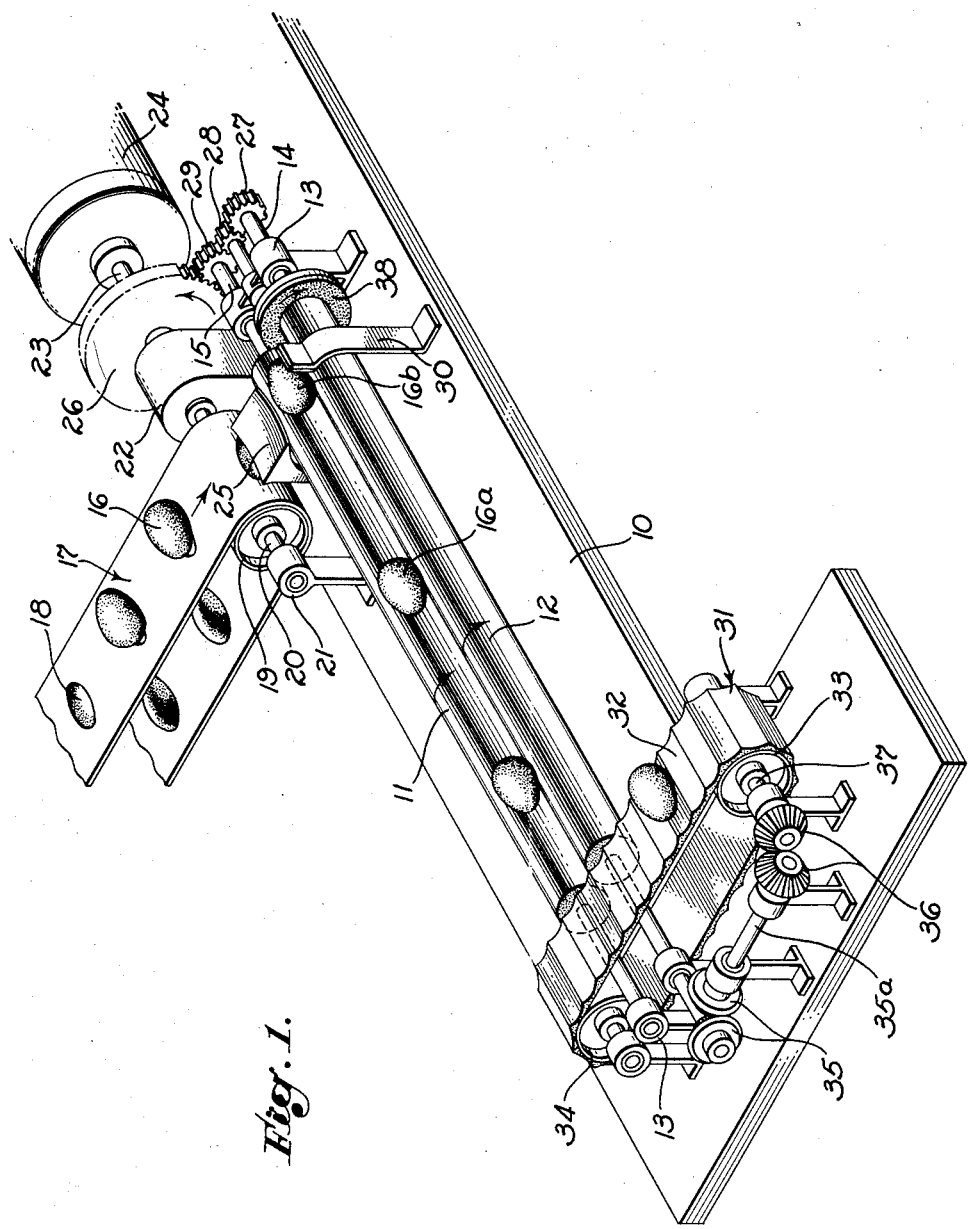
Figure 1 is a perspective view of orienting apparatus embodying the invention.

As explained above, the present invention contemplates generally the automatic orientation of indiscriminately arranged articles, such as food articles, so that all of the articles will occupy a similar common position for presentation to subsequent processing apparatus. One of the principal problems in the automatic processing of food articles, such as certain fruits and vegetables as well as other food articles such as eggs or nuts, is the problem of feeding the articles in properly oriented position to the processing equipment.

In accordance with my invention this problem is solved by providing a rotative supporting bed or trough to which the articles are fed in indiscriminate arrangement and which operates to orient the articles to a common position in an automatic manner so that all of the articles can be fed in this common position to subsequent processing equipment.

Referring to Figure 1 of the drawings, the apparatus includes a supporting bed or table 10 above which a pair of adjacent parallel orienting elements or rolls 11 and 12 are mounted to form an article orienting trough. The rolls are provided with a surface of rubber, canvas or the like to obtain good frictional contact with articles on the rolls. Suitable bearing supports 13 engage the respective shafts 14 and 15 of the rolls. Indiscriminately arranged articles, such as eggs 16, for example, may be fed to the rolls by means of a feed conveyor 17 having a series of pockets 18 and provided with suitable supporting drums including the driving drum 19. The drum 19 has its shaft 20 supported in suitable bearings 21 and is driven through a gear reduction mechanism 22 from the drive shaft 23 of an electric motor 24. A transfer chute 25 is provided between the discharge end of the conveyor 17 and the feed end of the rolls 11 and 12. In the present instance the chute 25 is shown with a concave face so that the articles will roll in passing from the conveyor 17 to the orienting rolls 11 and 12. A guard finger 30 is provided opposite the discharge of the feed conveyor 17 to prevent overshooting of an article of food with respect to the orienting rolls.

The drive of the feed conveyor 17 is timed with relation to the orienting rolls 11 and 12, which are driven from gear 26 on the motor shaft 23 through drive pinion 27 on the shaft 14, reversing gear 28 and drive pinion 29 on the shaft 15. It will be noted that the rolls 11 and 12 are driven in the same direction and apply rotative supporting forces to articles thereon so that the articles progress along the rolls. It will be appreciated that the speed of travel of different articles along the rolls 11 and 12 will vary so that to provide a proper timed drive between the feed conveyor and the rolls 11 and 12 will require appropriate changes in the drive gearing to effect the desired speed relationship. In the present instance, the rolls 11 and 12 are driven at the same speed, although for certain applications a differential speed relation between the rolls is preferred. Also if desired, one of the rolls may be of greater diameter than the other. For example, the roll 12 may be made larger to resist the tendency of articles to move off transversely of the rolls.

At the discharge end of the orienting and feeding rolls 11 and 12 a discharge and transfer conveyor 31 is provided in the form of a belt having a series of transverse article receiving depressions 32. The belt conveyor 31 is trained about respective driving and idler drums 33 and 34, and the drive for the conveyor 31 is provided through beveled gearing 35 from an end of the roll shaft 14, a connecting shaft 35a and beveled gearing 36 connecting to the shaft 37 of the driving drum 33.

As previously explained, it has been found that articles of the above character, when deposited in the trough formed by rolls 11 and 12, will orient themselves with their longitudinal or stem-blossom axes parallel to the axes of the rolls irrespective of irregular orientation on the feed conveyor and will be fed along the rolls with their longitudinal axes parallel to the roll axes and with their light ends leading. In other words, an egg deposited with its small end pointing toward the discharge end of the rolls 11 and 12, as indicated at 16a, will travel in that direction, while if the small end is pointing toward the feed end of the rolls 11 and 12, as indicated at 16b, the egg will travel toward the feed end of the rolls. This selective directional feeding of the articles is due apparently to the rotative effects applied by the rolls, which rotate in the same direction so that their adjacent surfaces which form the trough are traveling in opposite directions.

In order to effect automatic positioning or orientation of all the articles to travel in the same direction along the rolls, a turning device is provided in the form of a disk 38. The disk 38 is secured on the shaft 14 at the end of the roll 12 so that when the end of an article engages the disk 38 the article will be turned end for end, and then by virtue of the feeding action of the rolls 11 and 12 will travel toward the discharge end thereof. The problem of interference between turned articles and other articles fed from the feed conveyor 17 is taken care of by controlling the relative speeds of the conveyor 17 and the rolls 11 and 12 with respect to the spacing of the point of discharge of the feed conveyor 17 from the turning device 38 so that the article which is to be turned will travel to the turning device, be turned thereby and will travel beyond the discharge trough 25 before another article is discharged from the feed conveyor 17. If an even spacing of the articles on the feed and orienting rolls 11 and 12 is desired, the spacing of the discharge point for the articles with respect to the turning device 38 can be so selected with reference to the rate of feed of articles that an article which is turned around will be spaced from the next preceding article if it was fed in proper position by one-half of the amount of the spacing of articles which are fed with their small end pointing toward the discharge end of the rolls 11 and 12.

To summarize briefly the operation of the orienting and feeding means of Figure 1, articles are supplied in indiscriminate position to the feed conveyor 17 so as to be fed thereby one at a time in equally spaced relation, and the articles are deposited from the conveyor 17 in timed relation on the orienting and feeding rolls 11 and 12. The rolls 11 and 12 are rotating in the same direction so as to apply opposite rotative supporting effects to the articles which first of all serves to align the articles with their longitudinal axes parallel to the axes of the rolls and to progress the articles axially along the rolls in a direction depending upon the end-for-end position of the article. As previously explained, with articles such as eggs the articles travel with the small end foremost, while with other articles the large end may be in leading position. In any event, the articles, being indiscriminately positioned, will travel in either of one of two directions along the rolls 11 and 12 from their point of discharge from the feed conveyor 17.

The articles which travel toward the discharge end of the rolls 11 and 12 will be spaced apart substantially equally, while the articles which travel toward the opposite end of the rolls 11 and 12 will engage the turn-around device or disk 38 which will turn these articles end for end, so that they will also progress toward the discharge ends of the rolls 11 and 12. With the "turned" articles, the spacing will be approximately half way between articles which initially started to travel toward the discharge ends of the rolls 11 and 12.

From the discharge end of the orienting and feeding conveyor comprising the rolls 11 and 12, the articles are fed to the discharge or transfer conveyor 31 with all of the articles similarly oriented thereon.

Referring now to the modified form of the invention as shown in Figures 2 and 3, the apparatus includes a pair of orienting and feeding rolls 11a and 12a similar to the rolls 11 and 12 and similarly driven. In this instance the feed conveyor 17a is disposed intermediate the ends of the rolls 11a and 12a and respective pick-up and transfer devices are provided at the respective discharge ends of the orienting and feeding rolls. As each of these pick-up and transfer devices is similar, only one will be described. Each such device includes a pair of opposed jaws 41 and 42 pivotally mounted on a pin 43 supported between a pair of upward extensions 44 of a control slide 46. The jaws 41 and 42 are provided with respective concave faced pads 47 and 48 of sponge rubber or other suitable resilient material. The jaw 42 and its pad 48 are sufficiently narrow to be introduced and operated between the rolls 11a and 12a, while the upper jaw 41 is wider to provide in effect a three-point support of an article between the jaws. The rearward ends of the jaws 41 and 42 are connected by a spring 49 which urges them to closed position with their respective stop projections 51 engaged.

The jaws 41 and 42 are shown in retracted position with respect to the rolls 11a and 12a at the left of Figure 2, and means are provided for advancing the jaws into pick-up position in time with progression of articles along the rolls 11a and 12a. For this purpose a cam 52 is provided in cooperative relation with the slide 46, which is held against the cam by means of a spring 53. Suitable drive means are provided for the cam 52 to periodically advance the jaws 41 and 42 to a position overlapping the rolls 11a and 12a and to effect a dwell of the jaws in this position so that they can be opened and then be closed on an aritcle supported by the rolls to pick up the article therefrom.

The control of the jaws for pick up of an article is obtained by means of a slide 54 which is advanced with the slide 46 by means of a cam 56 against the action of a spring 55, the contour of the cam 56 being such that the slide 54 advances further than the jaw slide 46, so that the beveled end of the slide 54 engages between the rolls 57 on the rearward ends of the jaws 41 and 42 to open the jaws during the dwell in the motion of the slide 46, and in time to permit advance of an article between the jaws. The cam 56 then allows an immediate retraction of the slide 54 so that the jaws 41 and 42 can close on the article and pick it up from the rolls 11a and 12a.

Subsequently, the slide 46 is permitted to retract by its cam so that the article is removed from alignment with the rolls 11a and 12a, the slide 46 and the jaws 41 and 42 being maintained retracted during a dwell on the cam 52. During this latter dwell a cam 61 operates to engage the upper jaw and rotate the jaws 41 and 42 clockwise, as viewed at the left of Figure 2, or counter-clockwise, as viewed at the right of Figure 2, to move the jaws 41 and 42 with the article clamped therein into alignment with a discharge or article receiving conveyor 63. When the jaws 41 and 42 are in their downward position, a cam 64 engages the roller on the jaw 42 to open the jaws and permit depositing of the article into a receiving cup or other holding device on the discharge conveyor 63.

Subsequently, the jaws 41 and 42 are returned under the influence of the spring 66 to the position shown at the left of Figure 2 ready for another cycle of operation.

From the above description it will be apparent that the method and apparatus of the instant invention provide for the repositioning or orienting of indiscriminately arranged articles in a completely automatic manner so that these articles can be fed in a common oriented position to a processing apparatus. In connection with the processing of eggs, the processing apparatus would be, for example, an egg cracking machine. In connection with the processing of peaches or pears, for example, the processing apparatus would be a peach or pear preparation machine.

While I have shown certain preferred embodiments of the invention, it is apparent that it may be embodied in other forms so that its scope should be limited only by the scope of the claim appended hereto.

What is claimed is:

In an apparatus for orienting articles, such as eggs, peaches, pears, corn and the like, a pair of article supporting and feeding rolls disposed in parallel adjacent relation to provide an article supporting trough, means for effecting rotation of said rolls with their adjacent surfaces travelling oppositely, means for feeding indiscriminately arranged articles to said rolls in definite timed relation, whereby articles are oriented with their longitudinal axes parallel to the axes of the rolls and are progressed along the rolls with a predetermined end leading so that certain of the articles travel in one direction along said rolls and others of the articles travel in the other direction along said rolls, and a disk carried by one of the rolls and overlapping the trough therebetween for effecting turning of the articles travelling in said other direction.

ROY M. MAGNUSON.

REFERENCES CITED

The following references are of record in the file of this patent:

UNITED STATES PATENTS

| Number | Name | Date |
|---|---|---|
| 2,193,942 | Shackleford | Mar. 19, 1940 |
| 2,367,757 | Cutler | Jan. 23, 1945 |

FOREIGN PATENTS

| Number | Country | Date |
|---|---|---|
| 434,861 | Great Britain | Sept. 10, 1935 |
| 436,024 | Great Britain | Oct. 3, 1935 |